United States Patent
Yu et al.

(10) Patent No.: US 10,808,556 B2
(45) Date of Patent: Oct. 20, 2020

(54) INTEGRATED STRUT AND IGV CONFIGURATION

(71) Applicant: PRATT & WHITNEY CANADA CORP., Longueuil (CA)

(72) Inventors: Hong Yu, Oakville (CA); Ronald Dutton, Guelph (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 0 days.

(21) Appl. No.: 16/122,295

(22) Filed: Sep. 5, 2018

(65) Prior Publication Data

US 2020/0024954 A1    Jan. 23, 2020

Related U.S. Application Data

(62) Division of application No. 14/207,957, filed on Mar. 13, 2014, now Pat. No. 10,094,223.

(51) Int. Cl.
| | |
|---|---|
| *F01D 1/04* | (2006.01) |
| *F01D 9/04* | (2006.01) |
| *F01D 25/16* | (2006.01) |
| *F01D 5/14* | (2006.01) |
| *F01D 5/30* | (2006.01) |
| *B23P 15/00* | (2006.01) |
| *F04D 29/54* | (2006.01) |

(52) U.S. Cl.
CPC .............. *F01D 5/30* (2013.01); *B23P 15/006* (2013.01); *F01D 1/04* (2013.01); *F01D 5/142* (2013.01); *F01D 9/041* (2013.01); *F01D 25/162* (2013.01); *F04D 29/544* (2013.01); *Y02T 50/673* (2013.01)

(58) Field of Classification Search
CPC . F02K 3/075; F02K 3/068; F01D 1/04; F01D 17/162; F01D 5/142; F01D 9/041; F01D 25/162
See application file for complete search history.

(56) References Cited

U.S. PATENT DOCUMENTS

| | | |
|---|---|---|
| 2,844,001 A | 7/1958 | Alford |
| 3,442,493 A | 5/1969 | Smith, Jr. |
| 3,572,960 A | 3/1971 | McBride |
| 3,723,021 A | 3/1973 | Bartholomew |
| 4,874,289 A | 10/1989 | Smith, Jr. et al. |
| 5,045,325 A | 9/1991 | Lesko et al. |
| 5,520,511 A | 5/1996 | Loudet et al. |
| 5,619,916 A | 4/1997 | Sekine |
| 5,623,823 A | 4/1997 | Schirle et al. |
| 6,439,838 B1 | 8/2002 | Crall et al. |
| 6,607,353 B2 | 8/2003 | Masutani |
| 6,715,983 B2 | 4/2004 | Koshoffer et al. |
| 6,905,303 B2 | 6/2005 | Liu et al. |
| 7,114,911 B2 | 10/2006 | Martin et al. |
| 7,118,331 B2 | 10/2006 | Shahpar |
| 7,444,802 B2 | 11/2008 | Parry |
| 7,549,839 B2 | 6/2009 | Carroll et al. |
| 7,850,420 B2 | 12/2010 | Brees et al. |
| 8,206,097 B2 | 6/2012 | Nagai et al. |
| 2013/0259672 A1 | 10/2013 | Suciu et al. |

*Primary Examiner* — Christopher J Besler
(74) *Attorney, Agent, or Firm* — Norton Rose Fulbright Canada LLP

(57) ABSTRACT

A strut and IGV configuration in a gas turbine engine positioned at an upstream of a rotor includes a plurality of radial struts, for example for bearing engine loads, and a plurality of inlet guide vanes positioned axially spaced apart from the struts. The number of inlet guide vanes is greater than the number of struts. The struts are circumferentially aligned with the inlet guide vanes.

7 Claims, 4 Drawing Sheets

INTEGRATED STRUT AND IGV CONFIGURATION

CROSS-REFERENCE TO RELATED APPLICATIONS

The present application is a divisional of U.S. application Ser. No. 14/207,957 filed Mar. 13, 2014 the content of this application being incorporated herein by reference.

TECHNICAL FIELD

The application relates generally to aircraft gas turbine engines and, more particularly, to a strut and inlet guide vane (IGV) configuration for such engines.

BACKGROUND OF THE ART

In an aircraft gas turbine engine, air is pressurized by rotating blades and mixed with fuel and then ignited for generating hot combustion gases which flow downstream through a turbine for extracting energy therefrom. The air is channelled through rows of fan and/or compressor blades which pressurize the air in turn. In order to aerodynamically guide the air to the respective rotor stages, corresponding stators are disposed upstream therefrom. A conventional stator includes a row of struts extending radially inwardly from a supporting annular casing, with a row of inlet guide vanes positioned downstream of the struts and is configured for decelerating and guiding the air to the corresponding row of rotor blades. The struts are often configured as airfoils thicker and with larger chord lengths than the inlet guide vanes, in order to bear structural loads. In an inlet air flow entering the rotor, the struts cause thick wakes which tend to penetrate through the downstream inlet guide vane row, as schematically shown in FIG. 6. The thick and strong strut wakes may lead to an undesirable pressure distortion pattern for the rotor. This may lead to lower rotor efficiency and lower operability margins. The wakes will also cause forced vibratory stresses for the rotor blades.

Therefore, an improved strut and inlet guide vane configuration is needed.

SUMMARY

In one aspect, there is provided an aircraft gas turbine engine comprising a rotor having a rotation axis, an inlet flow passage leading to the rotor, a plurality of circumferentially-spaced struts radially extending between an outer casing and an inner hub and disposed in the inlet flow passage upstream of the rotor, and a plurality of circumferentially-spaced inlet guide vanes radially extending between the outer casing and the inner hub and disposed in the inlet flow passage upstream of the rotor, the inlet guide vanes being downstream of and axially spaced apart from the struts, each of the inlet guide vanes having an airfoil profile including leading and trailing edges and pressure and suction surfaces, a maximum thickness between the pressure and suction surfaces of the inlet guide vanes being smaller than a circumferential maximum thickness of the struts, the number of the inlet guide vanes being greater than the number of the struts, the struts circumferentially aligning with a respective one of the inlet guide vanes.

In another aspect, there is provided a method of providing an aircraft gas turbine engine, the method comprising: a) providing a plurality of circumferentially-spaced struts radially extending across an inlet flow passage leading to an engine rotor; b) providing a plurality of variable inlet guide vanes between the struts and the rotor, the number of variable inlet guide vanes being greater than the number of struts; c) circumferentially positioning the variable inlet guide vanes to allow the struts to circumferentially align with a respective one of the variable inlet guide vanes; and d) adjusting a position of a rotation axis of the respective variable inlet guide vanes such that in use a flow direction of air passing around each strut forms a wake which is then substantially redirected by a variable inlet guide vane when the variable inlet guide vane is in a maximum setting angle.

DESCRIPTION OF THE DRAWINGS

Reference is now made to the accompanying drawings in which.

DETAILED DESCRIPTION

Figure 1:
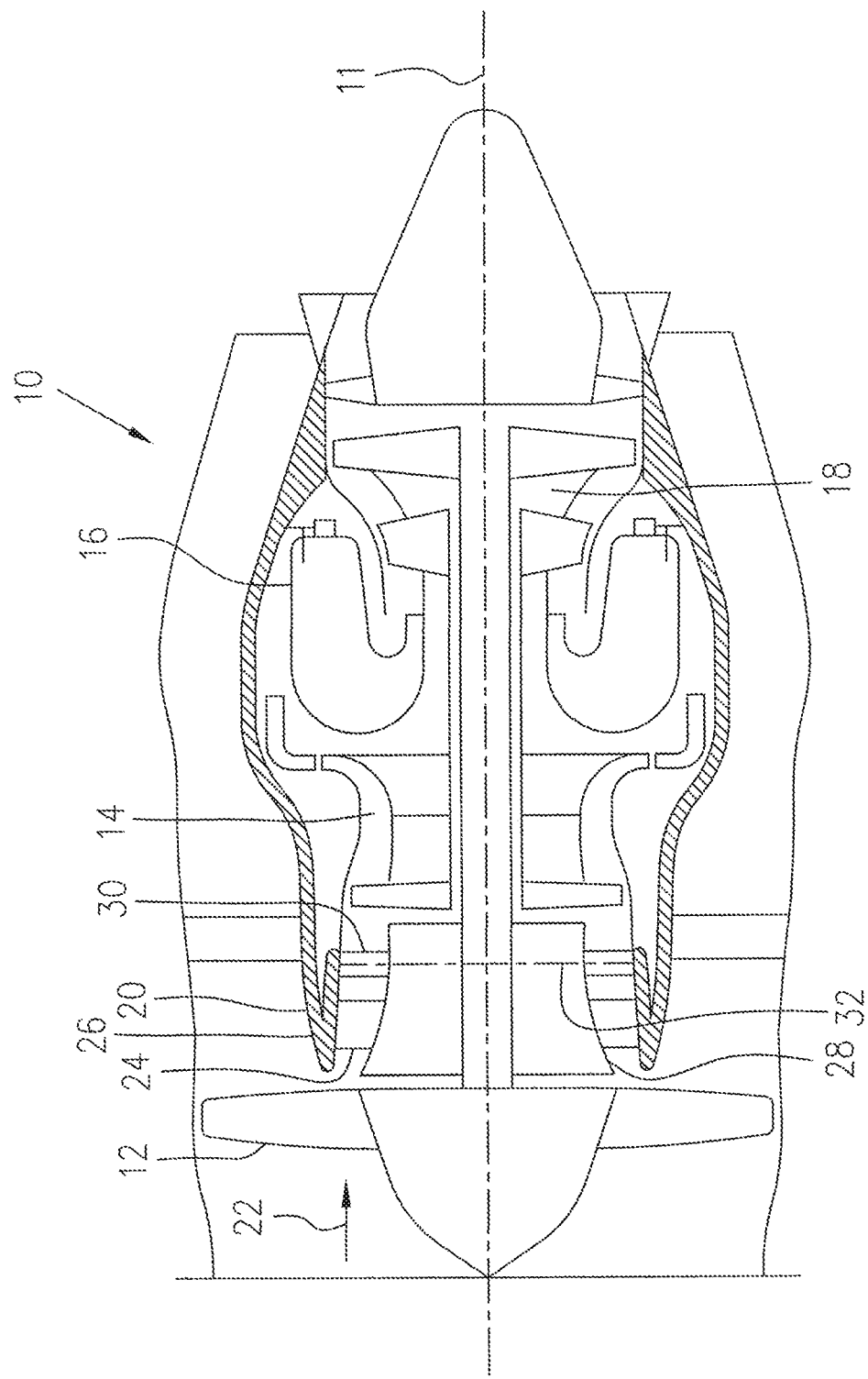
FIG. 1 is a schematic side cross-sectional view of an aircraft gas turbine engine.

FIG. 1 illustrates a gas turbine engine 10, which is taken as an exemplary application of the described subject matter. The gas turbine engine 10 generally comprises in serial flow communication: a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. Rotors of the respective fan 12, compressor section 14 and turbine section 18, rotate about an engine axis 11. Each of the rotors includes one or more rows of circumferentially spaced rotor blades 15, as shown in FIGS. 2-5.

It should be noted that the terms "upstream" and "downstream" used herein and hereinafter refer to the direction of a inlet flow passing through the main fluid path of the engine. It should also be noted that the terms "axial", "radial" and "circumferential" are used with respect to the central axis 11.

Figure 2:
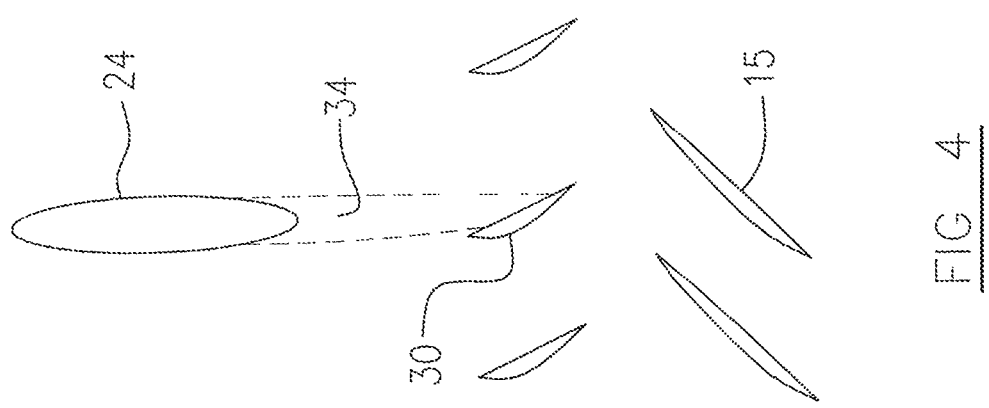
FIG. 2 is a schematic partial circumferential view of a strut and variable inlet guide vane configuration for the gas turbine engine of FIG. 1 according to one embodiment, showing a chord length of the respective inlet guide vanes relative to an axial gap between the struts and the inlet guide vanes.
Figure 4:
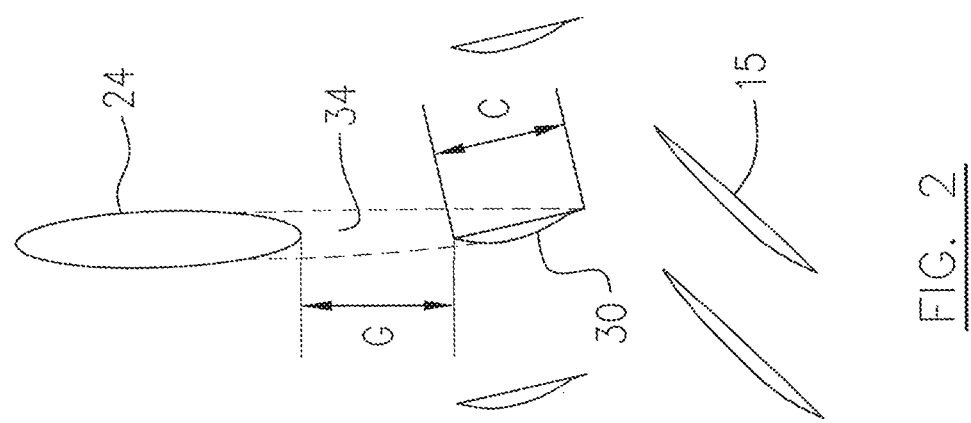
FIG. 4 is a schematic partial circumferential view of the strut and variable inlet guide vane configuration of FIG. 2, showing the variable inlet guide vanes positioned at a maximum closing setting angle.

Referring to FIGS. 1, 2 and 4, a strut and inlet guide vane (IGV) configuration 20 for example, is positioned upstream of a rotor of the compressor section 14 and around the rotating axis 11, to define a inlet flow passage in order to guide an inlet air flow 22 into the rotor of the compressor section 14. The strut and IGV configuration 20 may include a plurality of circumferentially evenly or unevenly spaced struts 24 which radially extend between and are supported by an outer casing 26 and an inner hub 28. The struts 24 cause respective strut wakes 34 in the air flow 22 passing through the inlet flow passage. The strut and IGV configuration 20 may further include a plurality of circumferentially spaced and radially extending variable inlet guide vanes 30 which are axially spaced downstream of and apart from the struts 24. The variable inlet guide vanes 30 are rotatable about a respective radial axis 32 to change their setting angles in order to adjust the inlet flow 22 entering the compressor section 14.

Each of the variable inlet guide vanes 30 may have an airfoil profile including leading and trailing edges (not numbered) and pressure and suction surfaces (not numbered) extending between the leading and trailing edges. The struts 24 may also have an airfoil profile. The struts 24 may be designed as thick airfoils (thick in a circumferential dimension) with a large chord length which is measured between the leading and trailing edges of the airfoil, in order to bear the structural loads of the engine 10. The respective struts 24 may be substantially identical or may have a different maximum thickness in the circumferential dimension thereof. There may be a few thick struts and a few thin struts. The variable inlet guide vanes 30 may each be configured to be smaller than the respective struts 24 either in airfoil thickness (the maximum thickness between the pressure and suction surfaces) or in chord length. In this embodiment, the number of variable inlet guide vanes may be much larger than the number of struts. For example the number of variable inlet guide vanes may be a multiple of the number of struts, and the variable inlet guide vanes 30 may be circumferentially positioned to be evenly spaced apart.

The circumferentially spaced variable inlet guide vanes 30 may be positioned such that each of the struts 24 is substantially axially aligned with one of the variable inlet guide vanes 30, as illustrated in FIG. 2.

As above-described, the variable inlet guide vanes 30 are rotatable about the radial axis 32 such that the variable inlet guide vanes 30 may be rotated to provide a maximum closing setting angle which may vary from 50 to 70 degrees and is referred to as "IGV closed" and a maximum open setting angle which may vary from 15 to 25 degrees and is referred to as "IGV open". A design point setting angle of the variable inlet guide vanes 30 is referred to as "IGV=0". FIG. 2 shows the variable inlet guide vanes 30 at IGV=0 while FIG. 4 shows the variable inlet guide vanes 30 at IGV closed.

It should be understood that the position of an airfoil of the variable inlet guide vanes at IGV closed or IGV open, may vary relative to the axially aligned strut 24 when the position of the rotating axis 32 relative to the airfoil is adjusted. For example, if the rotating axis 32 is positioned to radially extend through the variable inlet guide vane 30 close to its leading or trailing edges, the variable inlet guide vane at IGV closed or IGV open may deviate from the originally designed aligning position with the strut 24. Therefore, it may be desirable to adjust the position of the rotating axis 32 relative to the respective variable inlet guide vanes 30 during the design process of the strut and IGV configuration 20 such that a flow direction of each strut wake 34 is substantially blocked (i.e. a flow is substantially redirected) by one of the variable inlet guide vanes 30 which is substantially axially aligned with a strut 24 and is in an IGV closed setting. Therefore, no strut wakes 34 can impact the rotor blades 15 of the compressor section 14 which are located downstream of the variable inlet guide vanes 30.

The variable inlet guide vanes 30 according to this embodiment, may be substantially identical and may be axially spaced apart from the struts 24 by an axial gap G for example as measured between a strut 24 and a circumferentially aligned variable inlet guide vane 30 at IGV=0, as shown in FIG. 2. The variable inlet guide vanes 30 may be configured to have a chord length C in a range of 10% to 200% of the axial gap G, or may optionally be in a range of 30% to 100% of the axial gap G.

The above-described embodiment of the strut and IGV configuration advantageously prevents the strut wakes 34 created in the inlet flow 22, from penetrating through the row of variable inlet guide vanes 30 into the rotor of the compressor section 14, in order to reduce a forced vibration on the rotor blades 15 which could be caused by the wakes 34 of the thick struts 24. The strut and inlet guide vane losses in the inlet air flow 22, and pressure distortion at both design and off design IGV settings (including IGV open and IGV closed) may therefore be reduced.

Figure 5:
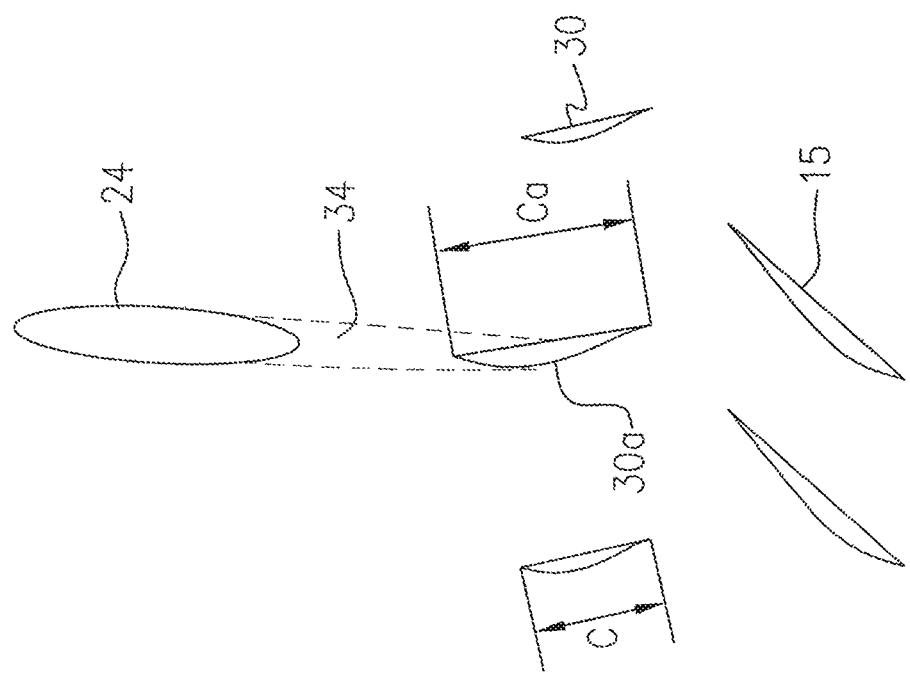
FIG. 5 is a schematic partial circumferential view of a strut and variable inlet guide vane configuration according a further embodiment.
Figure 6:
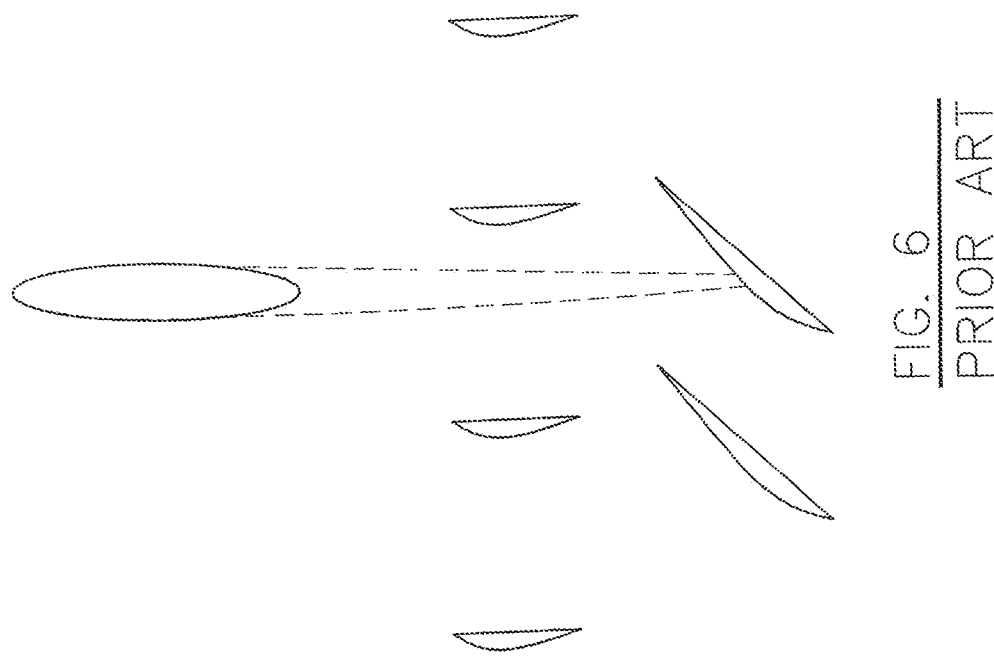
FIG. 6 is a schematic partial circumferential view of a conventional strut and inlet guide vane configuration.

Referring to FIGS. 1 and 5, the strut and IGV configuration 20 according to another embodiment may be configure such that a chord length Ca of each variable inlet guide vane 30a which is substantially circumferentially aligned with a strut 24, is greater or smaller than the chord length C of the remaining variable inlet guide vanes 30 in order to meet the required ratio between the variable inlet guide vane 30a and the circumferentially aligned strut 24 while allowing the remaining variable inlet guide vanes 30 to be configured to meet other design requirements.

Figure 3:
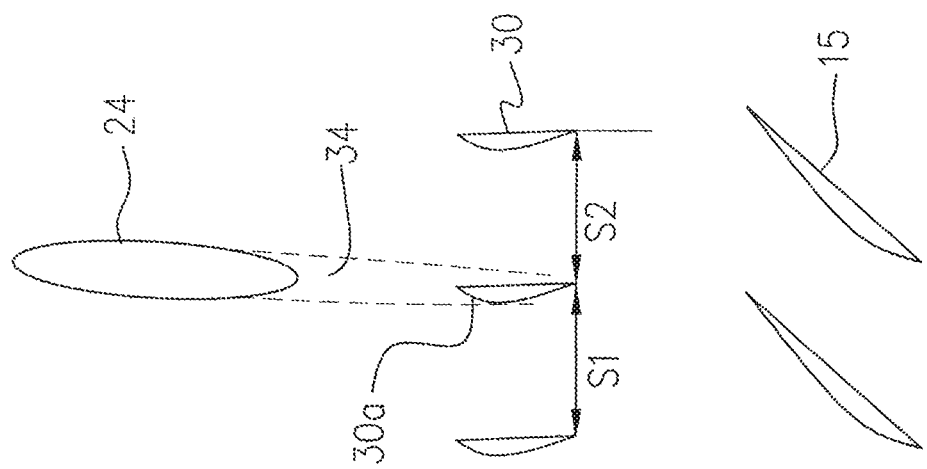
FIG. 3 is a schematic partial circumferential view of a strut and variable inlet guide vane configuration according to another embodiment.

Referring to FIGS. 1 and 3, the strut and IGV configuration 20 according to a further embodiment may be configured to include a row of the variable inlet guide vanes 30 unevenly circumferentially spaced apart one from another. For example, adjacent pitches S1 and S2 which are circumferentially measured between respective adjacent variable inlet guide vanes 30, are not equal. This application may be applied to ensure that each of the struts 24 (which are circumferentially evenly spaced apart one from another), is circumferentially aligned with one of the variable inlet guide vanes 30 when the number of variable inlet guide vanes 30 is not determined as a multiple of the number of struts in order to meet other design requirements. The embodiment of FIG. 3 may also have a narrower gap between the strut 24 and the circumferentially aligned variable inlet guide vane 30 with respect to the embodiment of FIG. 2.

The above description is meant to be exemplary only, and one skilled in the art will recognize that changes may be made to the embodiments described without departing from the scope of the described subject matter. For example, in the above-described embodiments the strut and IGV configuration is positioned immediately upstream of a compressor section. However, such a configuration may be positioned immediately upstream of a fan rotor in a turbofan gas turbine engine to guide inlet flow entering the fan rotor. The strut and IGV configuration may have stationary inlet guide vanes instead of variable inlet guide vanes. An example of a turbofan engine having a compressor with axial and centrifugal stages is illustrated in FIG. 1, however, the described subject matter is also applicable to turboprop and turbo-shaft engines, as well as to any suitable axial compressor arrangements. Modifications which fall within the scope of the described subject matter will be apparent to those skilled in the art, in light of a review of this disclosure, and such modifications are intended to fall within the appended claims.

The invention claimed is:

1. A method of providing an aircraft gas turbine engine, the method comprising:

providing a plurality of circumferentially-spaced struts radially extending across an inlet flow passage leading to an engine rotor, the plurality of circumferentially-spaced struts bearing structural loads of the aircraft gas turbine engine;

providing a plurality of variable inlet guide vanes between the struts and the rotor, the number of variable inlet guide vanes being greater than the number of struts, wherein each of the plurality of variable inlet guive vanes is individually rotatable about a respective rotation axis; and circumferentially positioning the variable inlet guide vanes to allow the struts to circumferentially align with a respective one of the variable inlet guide vanes; including:

during a design phase of the aircraft gas turbine engine, setting a position of the respective rotation axis of each variable inlet guide vane of the plurality of variable inlet guide vanes such that in use a flow direction of air passing around each strut of the plurality of circumferentially-spaced struts forms a respective strut wake which is then substantially redirected by a correspondingly aligned variable inlet guide vane of the plurality of variable inlet guide vanes when the correspondingly aligned variable inlet guide vane is in a maximum setting angle or in a design point setting angle, including selecting a chordwise position of the respective rotation axis of each variable inlet guide vanes of the plurality of variable inlet guide vanes between a leading edge and a trailing edge of each of the plurality of variable inlet guide vanes so that the plurality of variable inlet guide vanes substantially block the respective strut wakes downstream of the struts at both the design point setting angle and the maximum setting angle.

2. The method as defined in claim 1 further comprising: determining a chord length of the respective variable inlet guide vanes in a range of 10% to 200% of an axial gap between the struts and the variable inlet guide vanes.

3. The method as defined in claim 1 further comprising: determining a chord length of the respective variable inlet guide vanes in a range of 30% to 100% of an axial gap between the struts and the variable inlet guide vanes.

4. The method as defined in claim 1 further comprising: determining a chord length of said one of the variable inlet guide vanes circumferentially aligned with the respective struts, greater or smaller than a chord length of the remaining variable inlet guide vanes.

5. The method as defined in claim 1 wherein providing a plurality of variable inlet guide vanes includes: determining the number of the variable inlet guide vanes to be a multiple of the number of the struts.

6. The method as defined in claim 5 wherein circumferentially positioning the variable inlet guide vanes: includes positioning the variable inlet guide vanes to be circumferentially evenly spaced apart.

7. The method as defined in claim 1 wherein circumferentially positioning the variable inlet guide vanes includes: positioning the variable inlet guide vanes to be circumferentially unevenly spaced apart when the number of the variable inlet guide vanes is not a multiple of the number of the struts.

\* \* \* \* \*